United States Patent
Matsuda et al.

(10) Patent No.: US 8,355,105 B2
(45) Date of Patent: *Jan. 15, 2013

(54) ARRAY SUBSTRATE FOR LIQUID CRYSTAL PANEL AND LIQUID CRYSTAL PANEL

(75) Inventors: Hiroshi Matsuda, Gifu (JP); Yasushi Miyajima, Gifu (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,805

(22) Filed: Jun. 9, 2010

(65) Prior Publication Data

US 2010/0245747 A1 Sep. 30, 2010

Related U.S. Application Data

(63) Continuation of application No. 11/729,448, filed on Mar. 29, 2007, now Pat. No. 7,764,348.

(30) Foreign Application Priority Data

Mar. 30, 2006 (JP) .................................. 2006-095808

(51) Int. Cl.
*G02F 1/1345* (2006.01)
(52) U.S. Cl. ....................................... 349/149; 349/152
(58) Field of Classification Search .................. None
See application file for complete search history.

(56) References Cited

U.S. PATENT DOCUMENTS

| | | | |
|---|---|---|---|
| 5,959,708 A | 9/1999 | Lee et al. | |
| 6,262,702 B1 * | 7/2001 | Murade | 345/87 |
| 6,483,565 B1 | 11/2002 | Hidehira et al. | |
| 6,710,835 B2 * | 3/2004 | Kurahashi et al. | 349/141 |
| 6,924,875 B2 * | 8/2005 | Tomita | 349/149 |
| 7,142,274 B2 | 11/2006 | Kitagawa et al. | |
| 7,446,845 B2 | 11/2008 | Matsuda et al. | |
| 2002/0008828 A1 | 1/2002 | Park et al. | |
| 2002/0105612 A1 * | 8/2002 | Ohta et al. | 349/141 |
| 2002/0149729 A1 * | 10/2002 | Nishimura et al. | 349/141 |
| 2003/0202149 A1 * | 10/2003 | Miyajima et al. | 349/149 |
| 2006/0215102 A1 * | 9/2006 | Otose et al. | 349/151 |
| 2007/0229748 A1 | 10/2007 | Fujita | |

(Continued)

FOREIGN PATENT DOCUMENTS

JP 10-62767 3/1998

(Continued)

*Primary Examiner* — Thanh-Nhan P Nguyen
(74) *Attorney, Agent, or Firm* — K&L Gates LLP

(57) ABSTRACT

An array substrate for a liquid crystal panel includes a plurality of pixel electrodes corresponding to a plurality of pixels, and a common electrode provided common to the plurality of pixel electrodes. An alignment of liquid crystal is controlled by each electric field between each of the plurality of the pixel electrodes and the common electrode. The array substrate further includes a pixel selecting circuit, a line group for pixel selecting circuit, a potential applying circuit, a line group for potential applying circuit, and a common electrode line. The pixel selecting circuit sequentially selects pixels among the plurality of pixels. The line group for pixel selecting circuit is connected to input terminals of the pixel selecting circuit. The potential applying circuit applies a potential to the pixel electrode of a selected pixel. The line group for potential applying circuit is connected to input terminals of the potential applying circuit. The common electrode line is connected to the common electrode. The common electrode line extends in a region between the pixel selecting circuit and the potential applying circuit and in a region between the line group for pixel selecting circuit and the line group for potential applying circuit.

13 Claims, 9 Drawing Sheets

U.S. PATENT DOCUMENTS

2010/0039602 A1* 2/2010 Yamazaki et al. ............ 349/149

FOREIGN PATENT DOCUMENTS

| | | | |
|---|---|---|---|
| JP | 11-202366 | A | 7/1999 |
| JP | 2001-059976 | | 3/2001 |
| JP | 2002-296611 | A | 10/2002 |
| JP | 2005-234525 | A | 9/2005 |
| JP | 2005-284057 | A | 10/2005 |

* cited by examiner

ARRAY SUBSTRATE FOR LIQUID CRYSTAL PANEL AND LIQUID CRYSTAL PANEL

CROSS-REFERENCE TO RELATED APPLICATIONS

This application is a continuation of U.S. patent application Ser. No. 11/729,448 filed Mar. 29, 2007, now U.S. Pat. No. 7,764,348 which claims priority under 35 U.S.C. §119 to Japanese Patent Application No. JP2006-095808, the disclosure of which is hereby expressly incorporated by reference as part of the present disclosure as if fully set forth herein.

BACKGROUND

1. Technical Field

The present invention relates to an array substrate for a liquid crystal panel and a liquid crystal panel, and, in particular, to inhibiting crossing of lines in a structure having, on an array substrate, both a pixel electrode and a common electrode which create an electric field for controlling an alignment of liquid crystal.

2. Related Art

In related art, liquid crystal panels are known in which an alignment of liquid crystal is controlled by controlling an electric field (vertical electric field) between a pixel electrode of an array substrate and an opposing electrode of an opposing substrate. In addition, IPS (In-Plane Switching) mode liquid crystal panels and FFS (Fringe Field Switching) mode liquid crystal panels are two known types of liquid crystal panels having a relatively wide angle of view. In the liquid crystal panels of these modes, both the pixel electrode and a common electrode which corresponds to the opposing electrode are provided on the array substrate, and the alignment of the liquid crystal is controlled by controlling an electric field (horizontal electric field) created between the electrodes. The IPS mode liquid crystal panels are described in, for example, JP-A-10-62767 and the FFS mode liquid crystal panels are described in, for example, JP-A-2002-296611.

In liquid crystal panels using the horizontal electric field, because both of the two electrodes controlling the electric field are provided in the array substrate, the number of lines on the array substrate is increased compared to vertical electric field liquid crystal panels in which only the pixel electrode is provided on the array substrate. Thus, there is a disadvantage that lines may cross each other depending on the line layout.

SUMMARY

An advantage of some aspects of the invention is that a liquid crystal panel and an array substrate for a liquid crystal panel are provided in which crossing of lines can be inhibited even in a structure in which both the pixel electrode and the common electrode are provided in an array substrate.

According to an aspect of the invention, there is provided an array substrate for a liquid crystal panel, including a plurality of pixel electrodes corresponding to a plurality of pixels, and a common electrode provided common to the plurality of pixel electrodes. An alignment of liquid crystal is controlled by each electric field between each of the plurality of the pixel electrodes and the common electrode. The array substrate further includes a pixel selecting circuit, a line group for pixel selecting circuit, a potential applying circuit, a line group for potential applying circuit, and a common electrode line. The pixel selecting circuit sequentially selects pixels among the plurality of pixels. The line group for pixel selecting circuit is connected to input terminals of the pixel selecting circuit. The potential applying circuit applies a potential to the pixel electrode of a selected pixel. The line group for potential applying circuit is connected to input terminals of the potential applying circuit. The common electrode line is connected to the common electrode. The common electrode line extends in a region between the pixel selecting circuit and the potential applying circuit and in a region between the line group for pixel selecting circuit and the line group for potential applying circuit.

According to an aspect of the invention, it is possible to prevent crossing of lines even when both the pixel electrode and the common electrode are provided in the array substrate, and, as a result, inhibit increase in power consumption or the like.

BRIEF DESCRIPTION OF THE DRAWINGS

The invention will be described with reference to the accompanying drawings, wherein identical reference numbers are used to identify corresponding elements.

DESCRIPTION OF EXEMPLARY EMBODIMENTS

Figure 1:
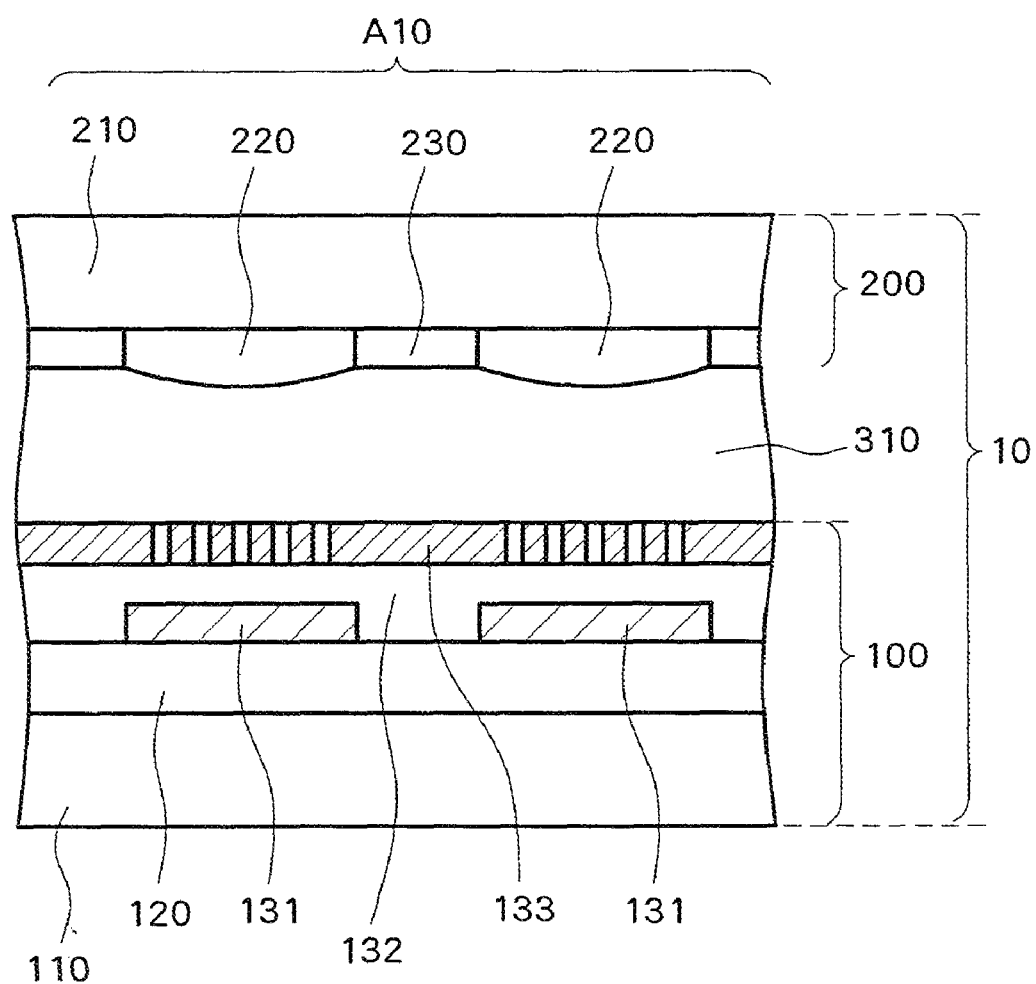
FIG. 1 is a cross sectional view showing a liquid crystal panel according to a first preferred embodiment of the invention.

FIG. 1 is a cross sectional view showing a liquid crystal panel 10 according to a first preferred embodiment of the invention. FIG. 1 illustrates a structure in a display region A10 of the liquid crystal panel 10, which is a region in which, for example, pixels are arranged in a matrix form and a video image or the like is displayed.

As shown in FIG. 1, the liquid crystal panel 10 includes an array substrate 100, an opposing substrate 200 which is placed opposing the array substrate 100, and liquid crystal 310 held between the two substrates 100 and 200. The array substrate 100 is also referred to as a TFT substrate or an element substrate and the opposing substrate is also referred to as a color filter substrate.

Figure 2A:
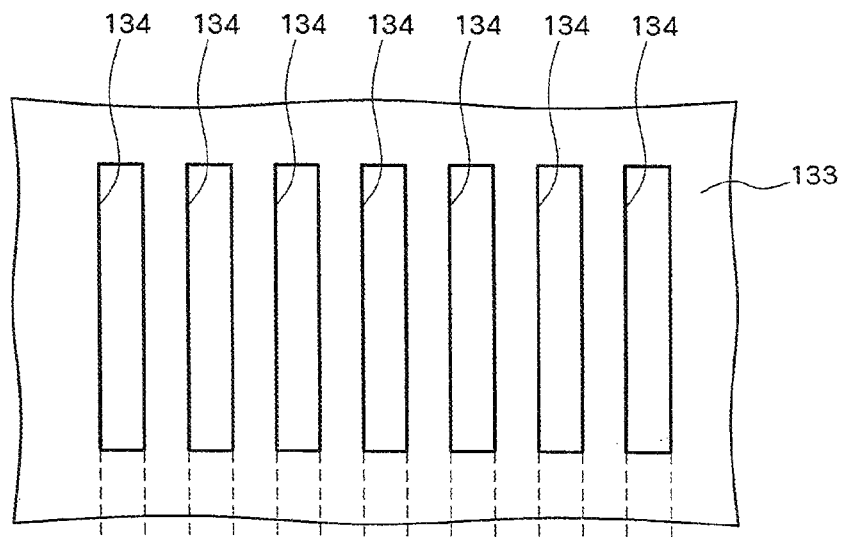
FIG. 2A is a plan view showing an array substrate according to the first preferred embodiment of the invention.
Figure 2B:
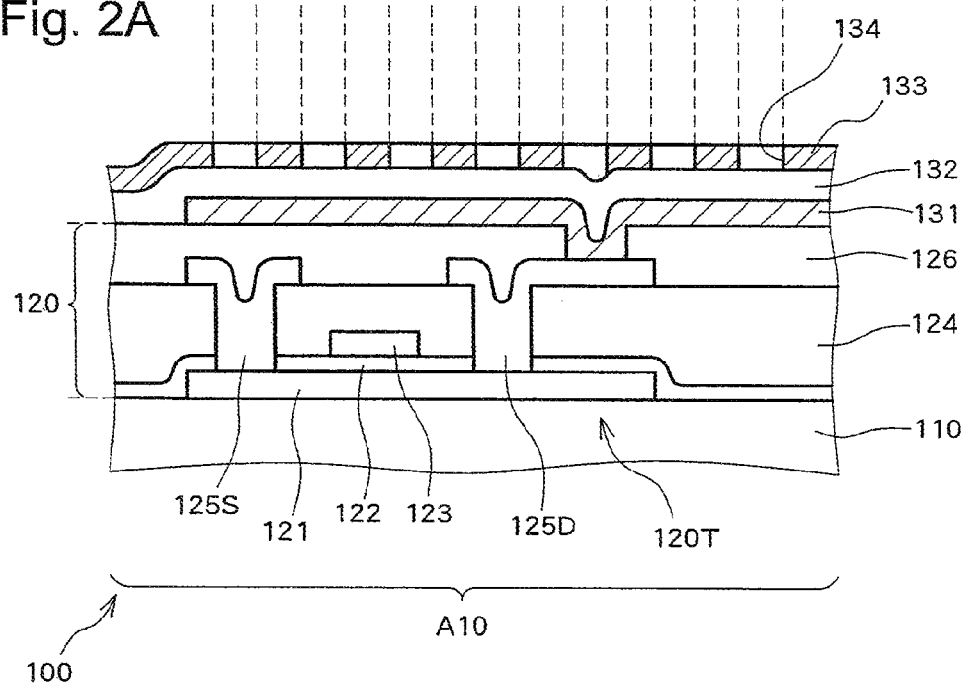
FIG. 2B is a cross sectional view showing an array substrate according to the first preferred embodiment of the invention.

FIGS. 2A and 2B are, respectively, a plan view and a cross sectional view of the display region A10 of the array substrate 100. As shown in FIGS. 1, 2A, and 2B, the array substrate 100 includes a substrate 110 made of glass or the like, a circuit layer 120 in which a pixel TFT (Thin Film Transistor) 120T or the like is formed, a pixel electrode 131, an interlayer insulating film 132, a common electrode 133, and an alignment layer (not shown). The pixel TFT 120T and the pixel electrode 131 are provided for each pixel, and, thus, FIG. 1 shows a structure of two pixels and FIGS. 2A and 2B show a structure of a pixel.

As shown in FIG. 2B, the circuit layer 120 has a semiconductor film 121, a gate insulating film 122, a gate electrode 123, an interlayer insulating film 124, a source electrode 125S, a drain electrode 125D, and an interlayer insulating film 126. The gate electrode 123, the gate insulating film 122, and the semiconductor film 121 are formed as components of a MIS (Metal Insulator Semiconductor) or MOS (Metal Oxide Semiconductor) structure of the pixel TFT 120T.

The semiconductor film 121 is provided to each pixel, and is locally placed on a surface of the substrate 110 opposing the opposing substrate 200. The semiconductor film 121 is made of, for example, a silicon film, and a source region, a drain region, and a channel region between the source region and the drain region (none of which is shown) are provided in the semiconductor film 121 for the pixel TFT 120T.

The gate insulating film 122 is made of, for example, a silicon oxide film or a silicon nitride film, and is layered on the semiconductor film 121 and the substrate 110.

The gate electrode 123 is made of, for example, a semiconductor film such as silicon or a metal film, and is provided on the gate insulating film 122 at a position opposing the channel region of the semiconductor film 121 with the gate insulating film 122 therebetween.

The interlayer insulating film 124 is made of, for example, a silicon oxide film, and is layered on the gate electrode 123 and the gate insulating film 122. The interlayer insulating film 124 also functions as a planarizing film.

The source electrode 125S and the drain electrode 125D are made of, for example, a metal film, and are layered on the interlayer insulating film 124. A contact hole is formed through the interlayer insulating film 124 and the gate insulating film 122 reaching the source region of the semiconductor film 121. The source electrode 125S is electrically connected to the source region through the contact hole. Similarly, the drain electrode 125D is electrically connected to the drain region of the semiconductor film 121 through a contact hole formed through the interlayer insulating film 124 and the gate insulating film 122.

The interlayer insulating film 126 is made of, for example, a silicon oxide film, and is layered on the source electrode 125S, on the drain electrode 125D, and on the interlayer insulating film 124. The interlayer insulating film 126 also functions as a planarizing film.

The pixel electrode 131 is layered on the interlayer insulating film 126 of the circuit layer 120, and is provided for each pixel. The pixel electrode 131 is made of, for example, a light-transmitting conductive film such as ITO (Indium Tin Oxide) or IZO (Indium Zinc Oxide). By forming light reflecting conductive film such as a metal over all or a portion of the pixel electrode 131, it is possible to form the liquid crystal panel 10 as a reflective or transflective liquid crystal panel. A contact hole reaching the drain electrode 125D is formed through the interlayer insulating film 126, and the pixel electrode 131 is electrically connected to the drain electrode 125D through the contact hole. Therefore, a potential (driving potential) of the pixel electrode 131 during driving is controlled by a driving device (not shown) through the pixel TFT 120T. Although in this configuration an electrode connected to the pixel electrode 131 is referred to as a drain electrode, it is also possible to refer to the electrode as a source electrode.

The interlayer insulating film 132 is made of, for example, a silicon oxide film, and is layered on the pixel electrode 131 and on the interlayer insulating film 126 of the circuit layer 120.

The common electrode 133 is made of, for example, a light-transmitting conductive film such as ITO or IZO. The common electrode 133 is layered on the interlayer insulating film 132, so that the common electrode 133 and the pixel electrode 131 are layered with the interlayer insulating film 132 therebetween in the display region A10. The common electrode 133 is provided over the entire region of the display region A10, and is provided common to the pixels in the display region A10, that is, the pixel electrodes 131 in the display region A10. At least one opening 134 penetrating through the common electrode 133 in the thickness direction is formed at a position of the common electrode 133 opposing the pixel electrode 131. The shape and number of the openings 134 are not limited to those shown in the drawings.

An alignment layer (not shown) is placed on the common electrode 133.

Figure 3:
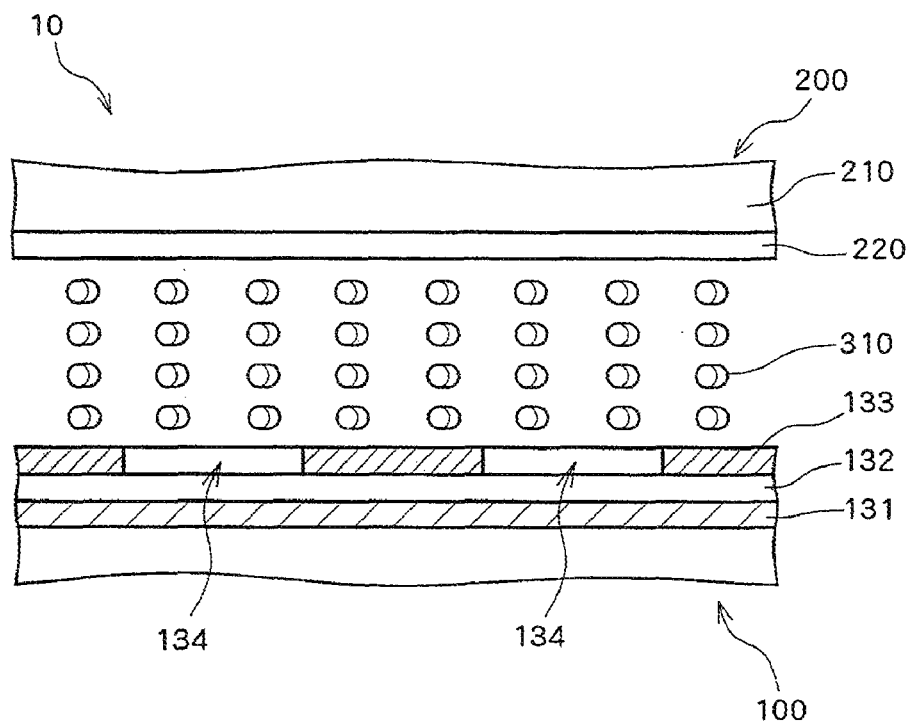
FIG. 3 is a schematic view illustrating control of an alignment of liquid crystal in a liquid crystal panel according to the first preferred embodiment of the invention when no electric field is applied.
Figure 4:
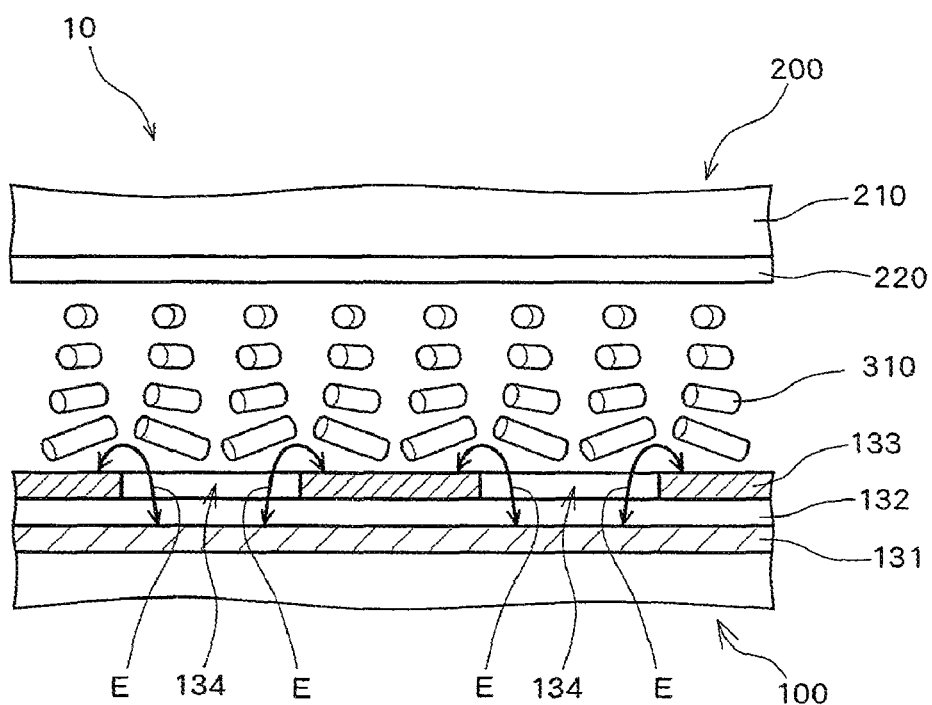
FIG. 4 is a schematic view illustrating control of an alignment of liquid crystal in a liquid crystal panel according to the first preferred embodiment of the invention when an electric field is applied.

FIGS. 3 and 4 are schematic views illustrating control of an alignment of liquid crystal 310 in the liquid crystal panel 10. As shown in FIG. 3, when the pixel electrode 131 and the common electrode 133 are set at a same potential, the liquid crystal 310 is aligned in a predetermined state. When, on the other hand, the potential of the pixel electrode 131 is set to a value different from that of the common electrode 133, an electric field E is formed through the opening 134 between the electrodes 131 and 133 as shown in FIG. 4, and the liquid crystal 310 is aligned in a state different from the state when no electric field is applied, which is shown in FIG. 3. In this process, the alignment of the liquid crystal 310, that is, the transmittance of the liquid crystal 310, is controlled by the strength of the electric field E between the electrodes 131 and 133, and the display light is dimmed. It is, of course, possible to employ alignments different from those shown in FIGS. 3 and 4, as long as the alignment can be controlled by the electric field E between the pixel electrode 131 and the common electrode 133.

A mode for controlling the alignment of the liquid crystal by an electric field between the pixel electrode and the common electrode layered on an array substrate with the interlayer insulating film therebetween is referred to as an FFS (Fringe Field Switching) mode.

As shown in FIG. 1, the opposing substrate 200 includes a substrate 210 made of glass or the like, a color filter 220, a light-shielding film 230, and an alignment layer (not shown).

The color filter 220 is placed on a surface of the substrate 210 opposing the array substrate 100 at a position opposing the pixel electrode 131 of the array substrate 100. In other words, the color filter 220 is provided for each pixel. The color filter 220 is made of, for example, a resin film of a color corresponding to the display color of the pixel.

The light-shielding film 230 is made of a resin film or a metal film such as chromium (Cr), and is provided on the substrate 210 to fill the gap between adjacent color filters 220.

An alignment layer (not shown) is provided on the color filter 220 and the light-shielding film 230.

The array substrate 100 and the opposing substrate 200 are placed so that the alignment layers (not shown) of the substrates 100 and 200 oppose each other, and the liquid crystal 310 is held in a gap between the substrate 100 and 200.

Figure 5:
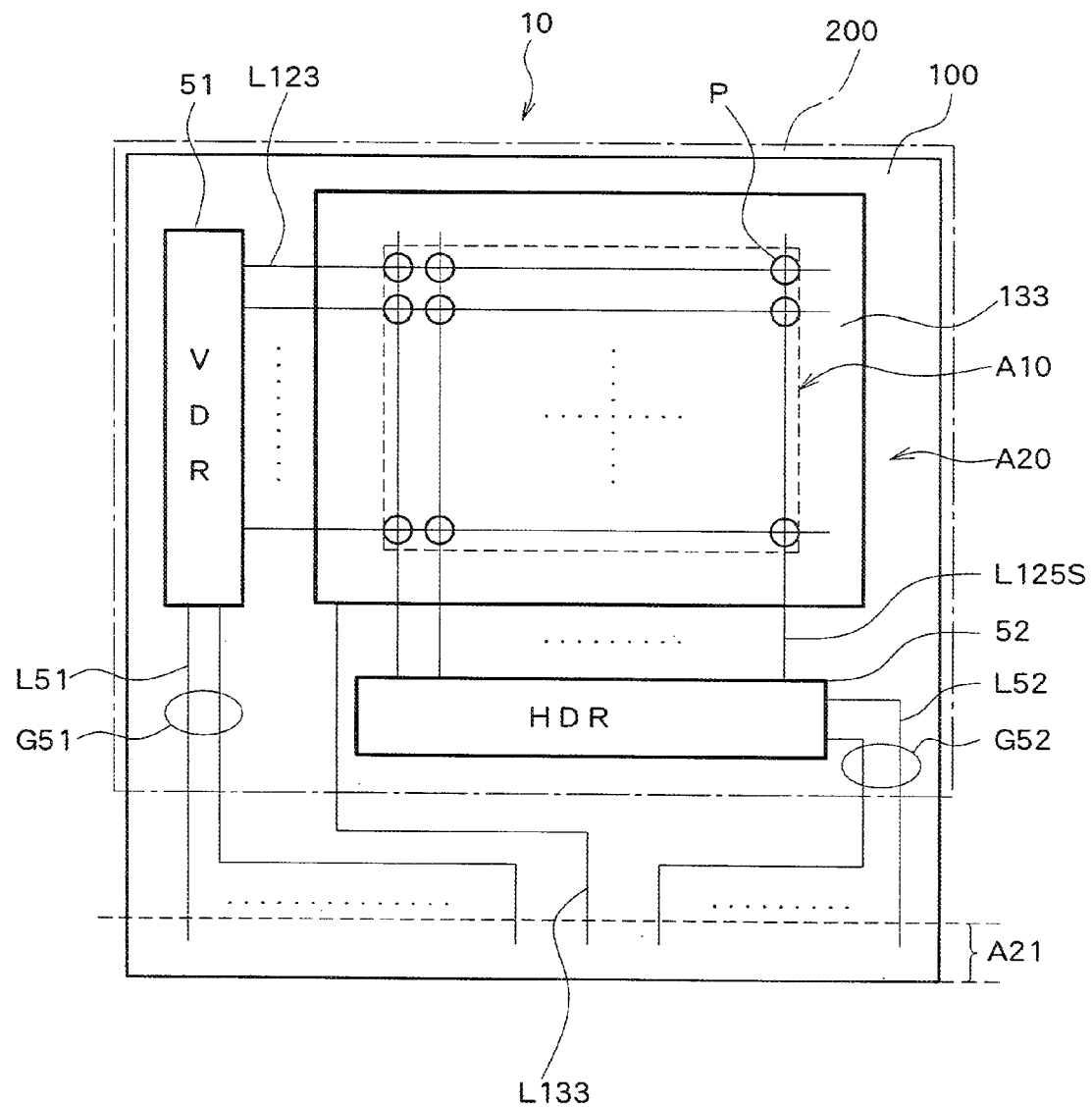
FIG. 5 is a plan view showing a liquid crystal panel according to the first preferred embodiment of the invention.

FIG. 5 is a plan view (layout view) of the liquid crystal panel 10. In FIG. 5, the pixel electrode 131, the light-shielding film 230, etc. are not shown, a pixel P is schematically shown with a circle (.smallcircle.), the display region A10 is shown with a broken line, and an outline of the opposing substrate 200 is shown with the dotted chain line. For purpose of simplifying the explanation, the display region A10 and the common electrode 133 are assumed to have a quadrangular shape as shown in FIG. 5. Although FIG. 5 shows the common electrode 133 to be larger than the display region A10, the common electrode 133 may be formed to match the display region A10.

As shown in FIG. 5, the array substrate 100 further includes a vertical driver 51 (shown with "VDR 51" in the drawings) and a horizontal driver 52 (shown with "HDR 52" in the drawings) which are a part of the driving device, and lines L123, L51, L125S, L52, and L133 which are made of, for example, a metal film. These structures are provided in the circuit layer 120 (refer to FIG. 1).

The plurality of lines L51 extend in the peripheral region A20. One end of each line L51 is provided within a terminal region A21, and the end of each line L51 forms an external connection terminal portion in the terminal region A21. The terminal region A21 is a part of the peripheral region A20, and is provided in a portion of the array substrate 100 not covered by the opposing substrate 200. In the example configuration of FIG. 5, the terminal region A21 is provided at a lower end of the array substrate 100. The other end of each line L51 is connected to an input terminal of the vertical driver 51 which is made of circuit elements such as a thin film transistor (TFT). The plurality of lines L51 are hereinafter collectively referred to as line group G51.

The vertical driver 51 is configured to process a signal or the like received through the input terminal, create a driving potential to be applied to a gate electrode 123 of the pixel TFT 120T (refer to FIG. 2), and output the created driving potential from a predetermined output terminal at a predetermined timing. The vertical driver 51 is provided in a region within the peripheral region A20 along one side of the display region A10 (or the common electrode 133). In the example configuration of FIG. 5, the vertical driver 51 is provided on the left of the display region A10.

A line L123 is connected to each output terminal of the vertical driver 51. Each line L123 extends into the display region A10, and is provided common to a plurality of pixels P. Thus, gate electrodes 123 of a plurality of pixel TFTs 120T (refer to FIG. 2) are connected to a line L123.

With this structure, the vertical driver 51 receives signals or the like through the lines L51 from an external device (not shown) forming another part of the driving device, creates a driving potential based on the received signals or the like, and outputs the driving potential to the line L123. In this process, the vertical driver 51 sequentially selects the plurality of lines L123, that is, the vertical driver 51 scans the plurality of lines L123, and applies the driving potential to the selected line L123. In this manner, the driving potential is applied simultaneously to the gate electrodes 123 of the plurality of pixel TFTs 120T connected to the selected line L123.

The plurality of lines L52 extend in the peripheral region A20. One end of each line L52 is provided in the terminal region A21 and forms an external connection terminal portion in the terminal region A21. The other end of each line L52 is connected to an input terminal of a horizontal driver 52 made of circuit elements such as a thin film transistor (TFT). The plurality of lines L52 are hereinafter collectively referred to as line group G52.

The horizontal driver 52 is configured to process a signal or the like received via the input terminal, create a predetermined driving potential corresponding to display data of the pixel P, and outputs the created driving potential from an output terminal at a predetermined timing. The horizontal driver 52 is provided in the peripheral region A20 and is provided in a region along one of the other sides, among the four sides of the display region A10 (or common electrode 133), which crosses the side to which the vertical driver 51 is adjacent. In the, example configuration of FIG. 5, the horizontal driver 52 is provided below the display region A10 in the drawing, between the display region A10 and the terminal region A21.

A line L125S is connected to each output terminal of the horizontal driver 52. Each line L125S extends into the display region A10, and is provided common to a plurality of pixels P. Thus, source electrodes 125S of a plurality of pixel TFTs 120T (refer to FIG. 2) are connected to a line L125S.

With this structure, the horizontal driver 52 receives signals or the like through the lines L52 from an external device (not shown) which forms another part of the driving device, creates a driving potential corresponding to display data based on the received signal or the like, and outputs the driving potential to the line L125S. In this process, the horizontal driver 52 outputs the driving potential for each pixel P to the pixels P connected to the selected line L51 in synchronization with the scanning of lines L51 by the vertical driver 51. In this manner, the driving potential is applied to each pixel electrodes 131 through the corresponding pixel TFT 120T connected to the selected line L123. The horizontal driver can simultaneously output driving potentials to the plurality of lines L125S.

The sequential selection operation of the lines L123 by the vertical driver 51 is equivalent to a sequential selection operation of pixels P to which the driving potential corresponding to the display data is to be applied. Thus, the vertical driver 51 may be referred to as a pixel selecting circuit. Regarding the horizontal driver 52, on the other hand, because the horizontal driver 52 applies a driving potential corresponding to display data of a selected pixel P to the pixel electrode 131 of the pixel P, the horizontal driver 52 may be referred to as a potential applying circuit. The line group G51 connected to the input terminals of the vertical driver 51 may be referred to as a line group for pixel selecting circuit. The line group G52 connected to the input terminals of the horizontal driver 52 may be referred to as a line group for potential applying circuit. The line groups G51 and G52, that is, the plurality of lines L51 and the plurality of lines L52 are provided in order to control the potentials of the pixel electrodes 131.

The line L133 extends in the peripheral region A20. One end of the line L133 is provided in the terminal region A21 and forms an external connection terminal portion in the terminal region A21. The other end of the line L133 is electrically connected to the common electrode 133. For example, the other end of the line L133 is electrically connected to the common electrode 133 at a region of the common electrode 133 near a corner portion close to both the vertical driver 51 and the horizontal driver 52. With this structure, a potential applied from an external device (not shown) which forms another part of the driving device to the external connection terminal portion of the line L133 is applied to the common electrode 133. In other words, the line L133 is provided for applying potential to the common electrode. Thus, the line L133 for the common electrode 133 is also referred to as a common electrode line L133.

The common electrode line L133 is placed avoiding crossing with the vertical driver 51, the horizontal driver 52, and the line groups G51 and G52. For example, the line L133 extends from the region of the common electrode 133 near the corner portion (that is, between the two drivers 51 and 52), through a region between the line groups G51 and G52, and into the terminal region A21. In addition, in the terminal region A21, the external connection terminal portion of the line L133 is provided between the external connection terminal portions of the line group G51 and the external connection terminal portions of the line group G52. With this form of placement, the common electrode line L133 extends into the terminal region A21 with a minimum length within an allowable range, avoiding crossing of liens as described above.

With this structure of the liquid crystal panel 10, crossing of the lines L51, L52, and L133 can be prevented, even when both the pixel electrode 131 and the common electrode 133 are provided on the array substrate 100. As a result, it is possible to inhibit increase in power consumption and avoid disadvantageous problems such as reduced reliability, delayed signals (delay of change of potential), voltage drop, and the like.

Figure 6:
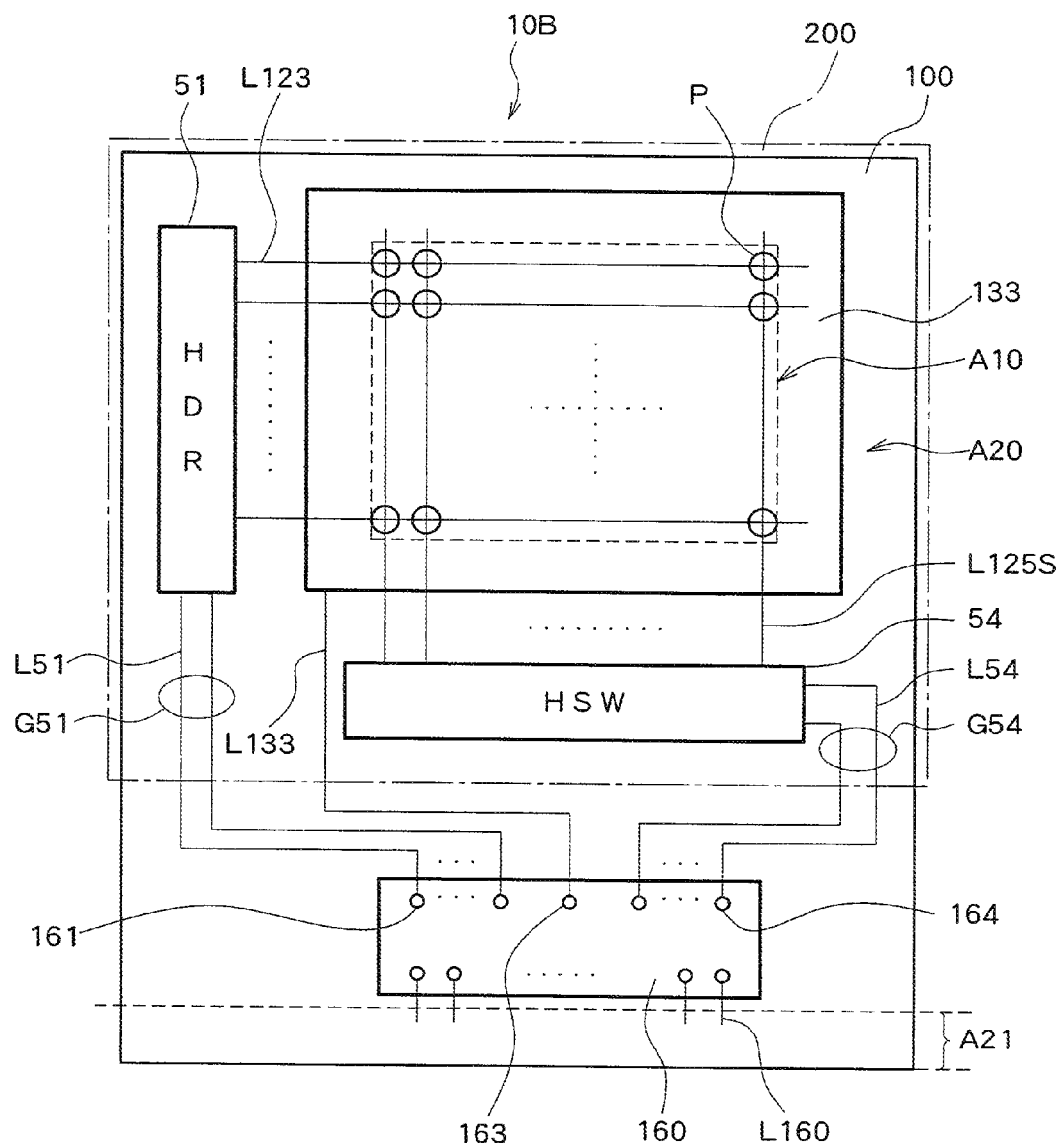
FIG. 6 is a plan view showing a liquid crystal panel according to a second preferred embodiment of the invention.

FIG. 6 is a plan view showing a liquid crystal panel 10B according to a second preferred embodiment of the invention. The liquid crystal panel 10B includes a horizontal switching circuit 54 (indicated with "HSW 54" in the drawings) and a plurality of lines L54 in place of the horizontal driver 52 and the plurality of lines L52 of the liquid crystal panel 10. In addition, the liquid crystal panel 10B includes an integrated circuit chip 160 and a plurality of lines L160 in addition to the elements of the liquid crystal panel 10. As the remaining elements of the liquid crystal panel 10B are similar to those of the liquid crystal panel 10, corresponding elements of the liquid crystal panels 10 and 10B are assigned the same reference numerals and will not be described again.

The plurality of lines L160 extend in the peripheral region A20. One end of each line L160 is provided within the terminal region A21 and forms an external connection terminal portion in the terminal region A21. The other end of each line L160 is connected to an input terminal of the integrated circuit chip 160.

The integrated circuit chip 160 is mounted on the array substrate 100 and is sealed by a resin or the like (not shown) The integrated circuit chip 160 is provided at a portion of the peripheral region A20 which is not covered by the opposing substrate 200. The integrated circuit chip 160 forms a driving device (not shown) along with the vertical driver 51 and the horizontal switching circuit 54. The integrated circuit chip 160 creates signals or the like to be supplied to the vertical driver 51 based on signals or the like received through the input terminal. The integrated circuit chip 160 outputs the created signals or the like through a plurality of output terminals 161. The integrated circuit ship 160 also creates, similar to a part of functions of the horizontal driver 52 of FIG. 5, a driving potential corresponding to display data of each pixel P and outputs the created driving potentials through a plurality of output terminals 164. Furthermore, the integrated circuit chip 160 also creates a potential to be applied to the common electrode 133 and outputs the created potential through an output terminal 163.

One end of each of the lines L51, L54, and L133 is connected to each of the output terminals 161, 164, and 163 of the integrated circuit chip 160. With this structure, a predetermined signal or the like and driving potential are supplied to the vertical driver 51, horizontal switching circuit 54, and common electrode 133.

The plurality of lines L54 extend in the peripheral region A20. One end of each line L54 is connected to the output terminal 164 of the integrated circuit chip 160 as described above, and the other end of each line L54 is connected to an input terminal of the horizontal switching circuit 54 including a circuit element such as a thin film transistor (TFT). The plurality of lines L54 will hereinafter be collectively referred to as a line group G54.

The horizontal switching circuit 54 is provided at a position similar to that of the horizontal driver 52 of FIG. 5. The horizontal switching circuit 54 is configured such that a driving potential input from the integrated circuit chip 160 through the input terminal is output from an output terminal at a predetermined timing. In this process, the horizontal switching circuit 54 outputs the driving potential in synchronization with the scanning of the line L123 by the vertical driver 51 and simultaneously from a plurality of output terminals, similar to the horizontal driver 52 of FIG. 5. In other words, functions similar to those of the horizontal driver 52 of FIG. 5 are realized by the creation function by the integrated circuit chip 160 of the driving potential corresponding to the display data and the functions of the horizontal switching circuit 54 as described above. Because such a horizontal switching circuit 54 applies a driving potential corresponding to the display data of a selected pixel P to the pixel electrode 131 of the pixel P, the horizontal switching circuit 54 may be referred to as a potential applying circuit. In this case, the line group G54 connected to the input terminals of the horizontal switching circuit 54 may be referred to as line groups for potential applying circuit. The line group G54, that is, the plurality of lines L54, is provided in order to control the potential of the pixel electrodes 131.

A line L125S is connected to each output terminal of the horizontal switching circuit 54. With this structure, a driving potential is applied to each pixel electrode 131 through the corresponding pixel TFT 120T connected to the line L123 selected by the vertical driver 51.

In the liquid crystal panel 10B also, the common electrode line L133 is placed preventing crossing with the vertical driver 51, the horizontal switching circuit 54, and the line groups G51 and G54. The common electrode line L133 extends in a region between the vertical driver 51 and the horizontal switching circuit 54 and between the two line groups G51 and G54. With this form of placement the common electrode line L133 can connect the integrated circuit chip 160 and the common electrode 133 with a minimum length within an allowable range in a placement preventing the crossing as described above. Therefore, the liquid crystal panel 10B can achieve an advantage similar to that of the liquid crystal panel 10.

Figure 7:
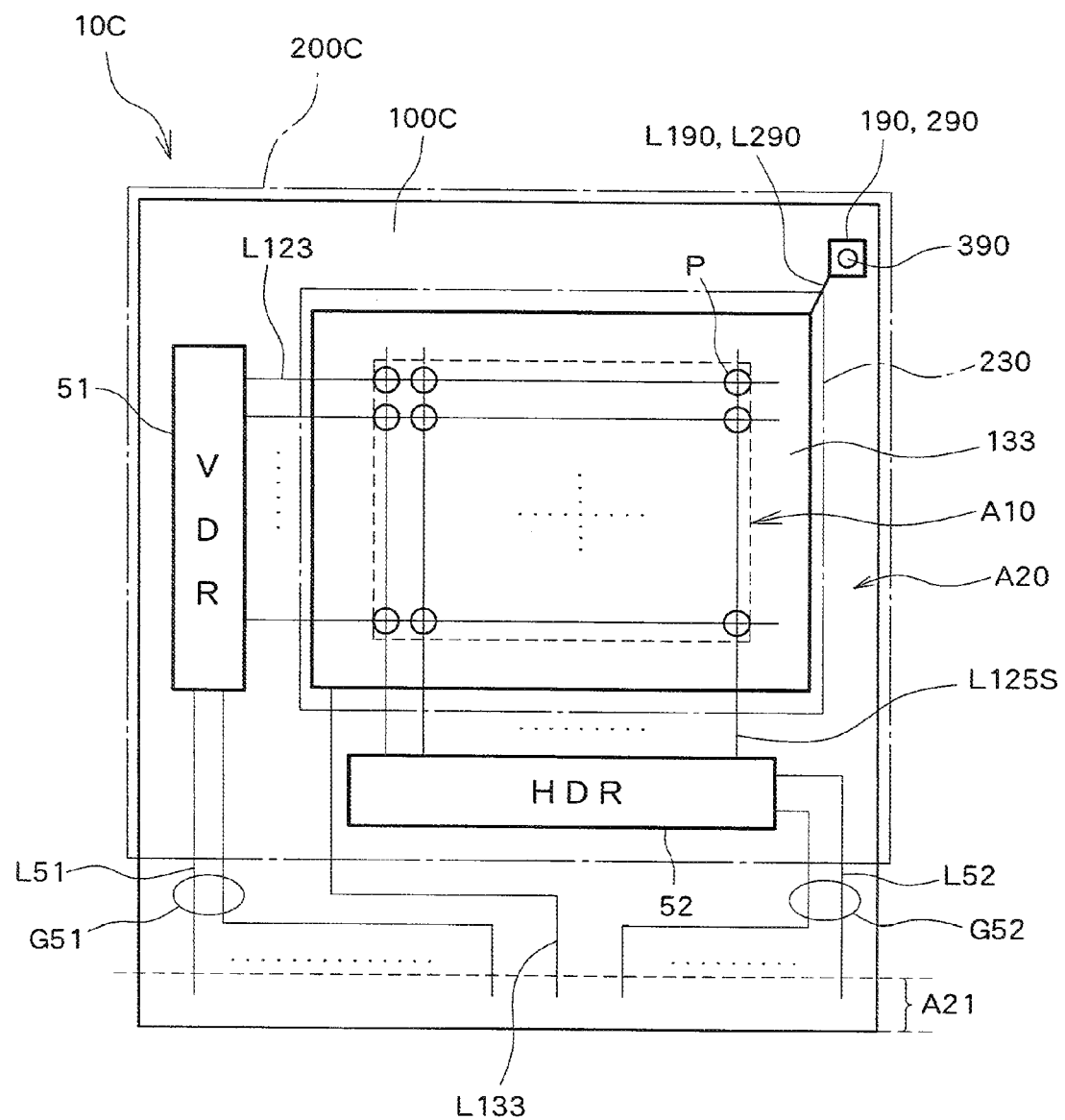
FIG. 7 is a plan view showing a liquid crystal panel according to a third preferred embodiment of the invention.
Figure 8:
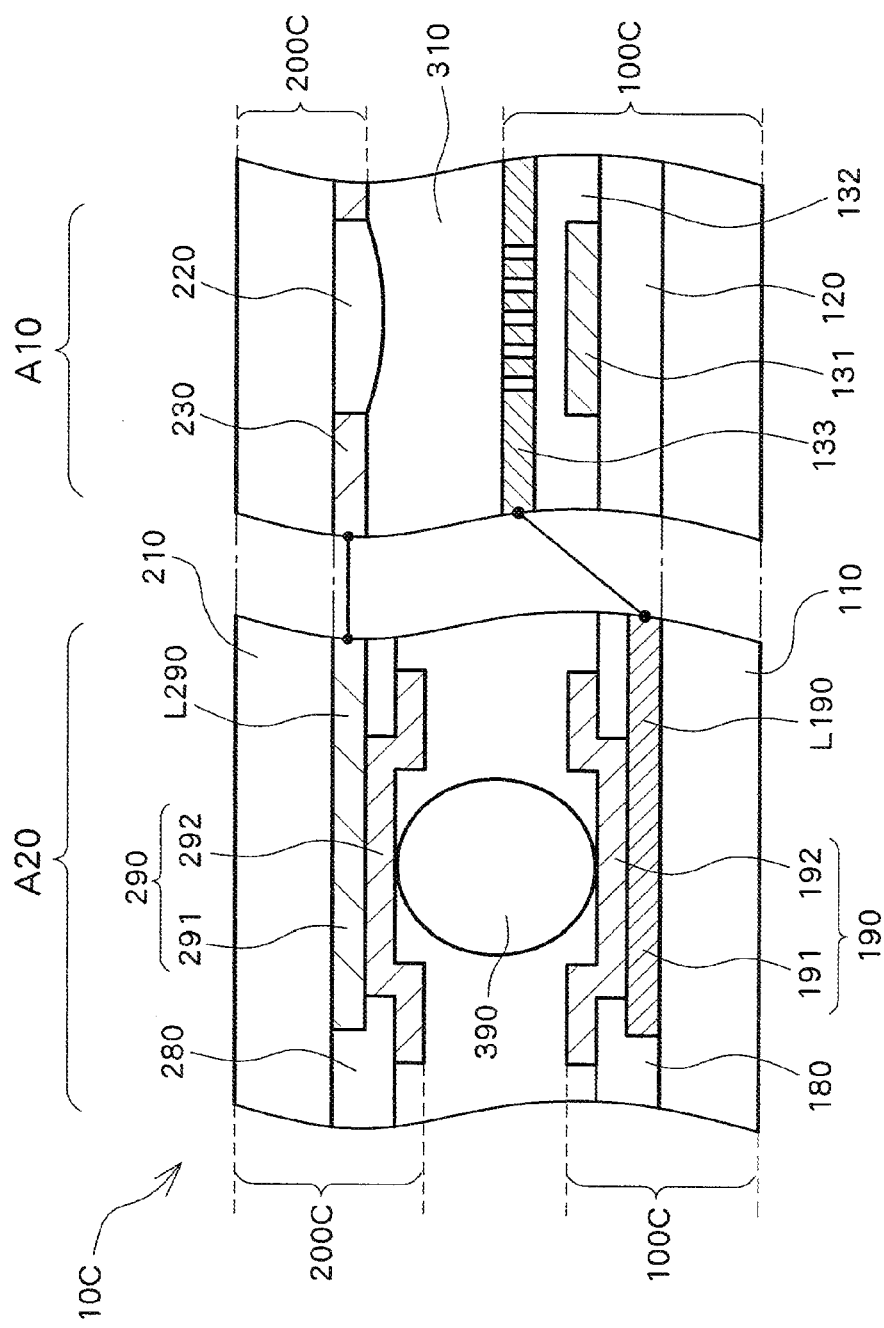
FIG. 8 is a cross sectional view showing a liquid crystal panel according to a third preferred embodiment of the invention.

FIGS. 7 and 8 are, respectively, a plan view and a cross sectional view showing a liquid crystal panel 10C according to a third preferred embodiment of the invention. Although in FIG. 7 the light-shielding film 230 is shown as outlined by the dotted chain line, the placement of the light-shielding film 230 is not limited to the area shown in FIG. 7. In the liquid crystal panel 10C, the light-shielding film 230 is made of a metal film such as chromium (Cr), and a structure for applying a potential identical to that of the common electrode 133 to the conductive light-shielding film 230 is additionally provided.

The array substrate 100C of the liquid crystal panel 10C additionally includes an array substrate-side extension line L190, an insulating film 180, and an array substrate-side pad 192 in the peripheral region A20 of the array substrate 100 (refer to FIG. 1). The opposing substrate 200C of the liquid crystal panel 10C additionally includes an opposing substrate-side extension line L290, an insulating film 280, and an opposing substrate-side pad 292 in the peripheral region A20 of the opposing substrate 200 (refer to FIG. 1). The liquid crystal panel 10C further includes a conductive member 390 between the substrates 100C and 200C. As the remaining elements of the liquid crystal panel 10C are similar to those in the liquid crystal panel 10, corresponding elements of the liquid crystal panels 10 and 10C are assigned the same reference numerals and will not be described again.

The array substrate-side extension line L190 is provided on the substrate 110, for example. The line L190 is electrically connected to the common electrode 133 at one end and extending to a position distant from the common electrode 133. The extension line L190 may be formed of, for example, a metal film, or may be formed along with the common electrode 133 by patterning the conductive film for the common electrode 133.

The insulating film 180 is made of, for example, a silicon oxide film, is layered on the array substrate-side extension line L190, and has an opening on a portion 191 of the extension line L190.

The array substrate-side pad 192 is placed on the insulating film 180, and contacts the portion 191 of the array substrate-side extension line L190 through the opening of the insulating film 180. With this structure, an array substrate-side electrode portion 190 is formed by the portion 191 of the extension line L190 and the pad 192. The array substrate-side pad 192 is made of a conductive film such as, for example, a metal, ITO, or IZO.

The opposing substrate-side extension line L290 is provided on the substrate 210, for example. The extension line L290 is electrically connected to the conductive light-shielding film 230 at one end and extending to a position distant from the light-shielding film 230. The extension line L290 may be made of, for example, a metal film, or may be formed along with the light-shielding film 230 by patterning the conductive film for the light-shielding film 230.

The insulating film 280 is made of, for example, a silicon oxide film, is layered on the opposing substrate-side extension line L290, and has an opening on a portion 291 of the extension line L290.

The opposing substrate-side pad 292 is placed on the insulating film 280, and contacts the portion 291 of the opposing substrate-side extension line L290 through the opening of the insulating film 280. With this structure, an opposing substrate-side electrode portion 290 is formed by a portion 291 of the extension line L290 and the pad 292. The opposing substrate-side pad 292 is made of a conductive film such as, for example, a metal, ITO, or IZO.

Because the array substrate-side electrode portion 190 and the opposing substrate-side electrode portion 290 are provided opposing each other in the peripheral region A20, the array substrate-side extension line L190 extends from the common electrode 133 towards the array substrate-side electrode portion 190, and the opposing substrate-side extension line L290 extends from the conductive light-shielding film 230 towards the opposing substrate-side electrode portion 290. In FIG. 7, an example of configuration is shown in which the entire extension line L190 and the entire extension line L290 oppose each other. The extension position and the extension direction of the extension lines L190 and L290 are not limited to those shown in FIG. 7. By extending the array substrate-side extension line L190 preventing crossing with the drivers 51 and 52 and the line groups G51 and G52, it is possible to inhibit increase in the power consumption, etc. similar to the liquid crystal panel 10 (refer to FIG. 1).

The conductive member 390 is placed between the array substrate 100C and the opposing substrate 200C, and contacts the array substrate-side electrode portion 190 and the opposing substrate-side electrode portion 290. In this manner, the array substrate-side extension line L190 and the opposing substrate-side extension line L290 are electrically connected and a potential identical to that of the common electrode 133 is applied to the conductive light-shielding film 230.

Although the conductive member 390 illustrated in FIG. 7 is a spherical structure (bead) made of a conductive material such as a metal, the conductive member 390 is not limited to such a configuration, and may be, for example, a plurality of spherical structures or one or a plurality of fibers or the like. Any structure may be used as the conductive member 390 such as, for example, a structure in which a surface of a resin sphere is coated with a metal, as long as the common electrode 133 and the conductive light-shielding film 230 can be electrically connected. The conductive member 390 can be installed between the substrates 100C and 200C by mixing a conductive or nonconductive paste material (not shown) with the material of the conductive member 390, placing the mixed material on at least one of the two electrode portions 190 and 290, and bonding the array substrate 100C and the opposing substrate 200C. As the paste material, for example, it is possible to use the sealing material for sealing the liquid crystal 310.

The conductive member 390 need not have a solid structure such as the sphere as described above, and may be, for example, a conductive paste such as gold (Au) paste. By placing the conductive member 390 in a paste form on at least one of the electrode portions 190 and 290, and bonding the array substrate 100C and the opposing substrate 200C, it is possible to place the conductive member 390 between the substrates 100C and 200C. It is also possible to mix a spacer (may be conductive or not conductive) in the conductive paste forming the conductive member 390.

With this structure, a potential identical to that of the common electrode 133 is applied to the conductive light-shielding film 230. Because of this, the potential of the light-shielding film 230 does not become a floating state. The common electrode 133 is a conductive film, on the array substrate 100C, which is placed closest to the liquid crystal 310, and the light-shielding film 230 is a conductive film, on the opposing substrate 200C, which is placed closest to the liquid crystal 310. In other words, the common electrode 133 and the light-shielding film 230 are conductive films that are positioned closest to each other with the liquid crystal 310 therebetween. It is possible to prevent formation of an electric field between the common electrode 133 and the light-shielding film 230. Therefore, the potential of the light-shielding film 230 does not cause a disadvantage in the alignment of the liquid crystal 310.

With the conductive light-shielding film 230, cost can be reduced because it is not necessary to provide a conductive film such as an ITO film above the light-shielding film 230. With the light-shielding film 230 made of a metal film such as chromium (Cr), because the light-shielding film 230 can be formed in a thinner thickness than that of the light-shielding film made of a resin, fine patterning is possible and the light-shielding film has a superior planarizing characteristic. Costs can be reduced by employing a light-shielding film 230 made of a metal film in place of the resin light-shielding film.

The array substrate-side electrode portion 190 may be formed without the use of the pad 192. Similarly, the opposing substrate-side electrode portion 290 may be formed without the use of the pad 292. The extension lines L190 and L290, electrode portions 190 and 290, and the conductive member 390 may be provided on the liquid crystal panel 10B of FIG. 6.

Figure 9:
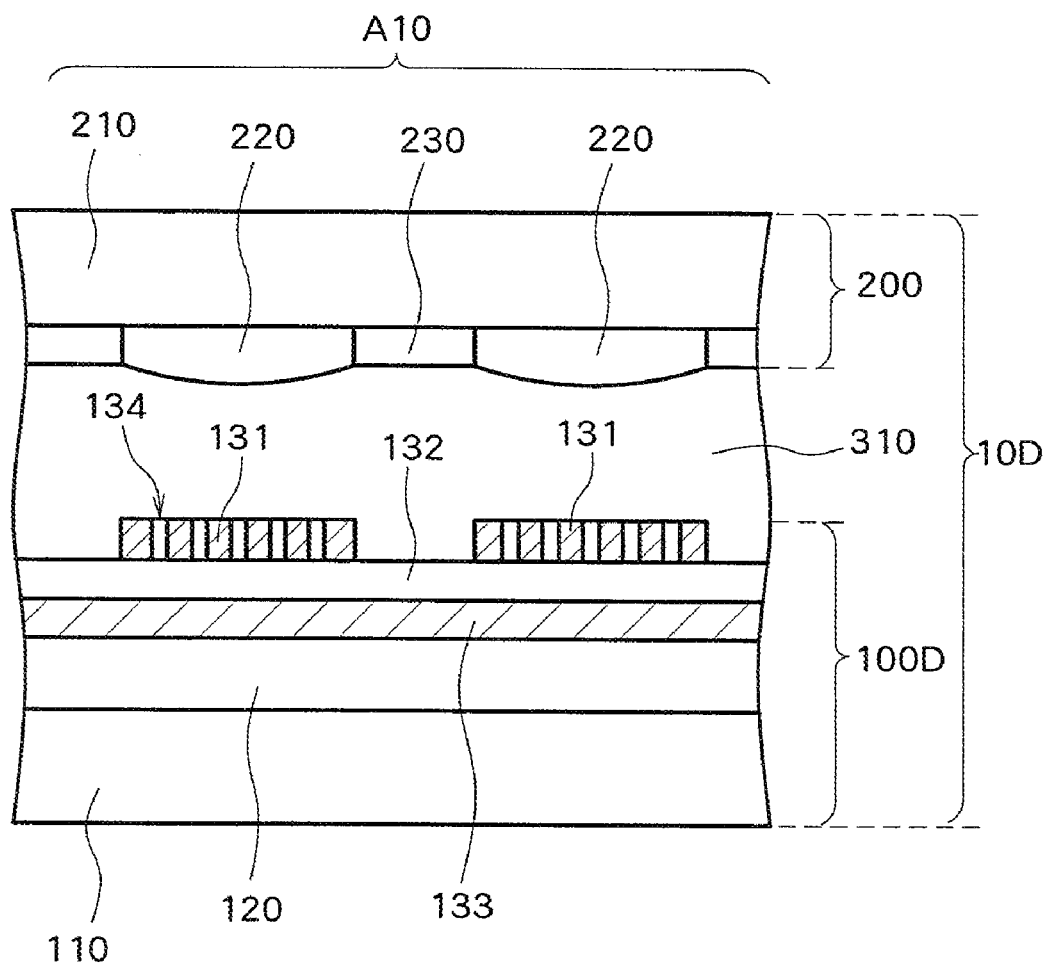
FIG. 9 is a cross sectional view showing a liquid crystal panel according to a fourth preferred embodiment of the invention.

Alternatively, it is also possible to apply a liquid crystal panel 10D according to a fourth preferred embodiment of the invention, as shown in a cross sectional view of FIG. 9, to the structure of the display region A10 of the liquid crystal panels 10, 10B, and 10C. FIG. 9 shows only the structure in the display region A10 of the liquid crystal panel 10D.

The liquid crystal panel 10D has a structure in which the array substrate 100 of the liquid crystal panel 10 in FIG. 1 is replaced with an array substrate 100D. In the array substrate 100D, the placement relationship between the pixel electrode 131 and the common electrode 133 is reversed compared to that in the array substrate 100 of FIG. 1. Thus, the common electrode 133, the interlayer insulating film 132, and the pixel electrode 131 are layered above the circuit layer 120 in that order. In addition, in the array substrate 100D, the openings 134 are formed through the pixel electrode 131, and the electric field E (refer to FIG. 4) between the pixel electrode 131 and the common electrode 133 is created through each opening 134. The liquid crystal panel 10D also is an FFS mode liquid crystal panel. The remaining elements of the array substrate 100D are similar to those of the array substrate 100 of FIG. 1.

In the liquid crystal panel 10D also, because both the pixel electrode 131 and the common electrode 133 are provided in the array substrate 100D, it is possible to place the common electrode line L133, the line groups G51 and G52, etc. in a manner similar to that in the liquid crystal panels 10, 10B, and 10C.

Figure 10:
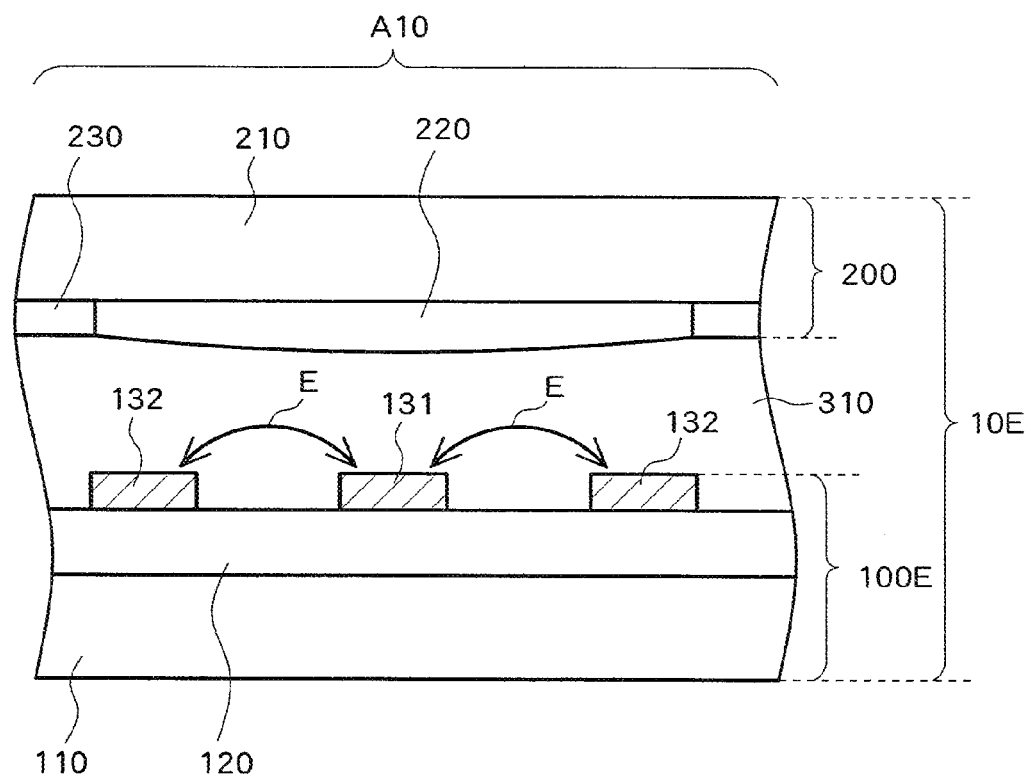
FIG. 10 is a cross sectional view showing a liquid crystal panel according to a fifth preferred embodiment of the invention.

Alternatively, it is also possible to apply a liquid crystal panel 10E according to a fifth preferred embodiment of the invention, as shown in a cross sectional view of FIG. 10, to the structure of the display region A10 of the liquid crystal panels 10, 10B, and 10C. FIG. 10 shows only the structure in the display region A10 of the liquid crystal panel 10E.

The liquid crystal panel 10E has a structure in which the array substrate 100 of the liquid crystal panel 10 of FIG. 1 is replaced with an array substrate 100E. In the array substrate 100E, both the pixel electrode 131 and the common electrode 133 are placed on the circuit layer 120 with a space therebetween, and the alignment of the liquid crystal 310 is controlled by an electric field E created between the pixel electrode 131 and the common electrode 133. The liquid crystal panel 10E is an IPS (In-Plane Switching) mode liquid crystal panel. The remaining elements of the array substrate 100E are similar to those in the array substrate 100 of FIG. 1.

In the liquid crystal panel 10E also, because both the pixel electrode 131 and the common electrode 133 are provided in the array substrate 100E, it is possible to place the common electrode line L133, the lines groups G51 and G52, etc. in a manner similar to that in the liquid crystal panels 10, 10B, and 10C.

It will be obvious to those having skill in the art that many changes may be made in the above-described details of the preferred embodiments of the invention. The scope of the invention, therefore, should be determined by the following claims.

What is claimed is:

1. An array substrate for a liquid crystal panel, the array substrate comprising:
   pixel electrodes corresponding to pixels;
   a common electrode that is common to all of the pixel electrodes and that is capable of forming an electric field that controls an alignment of liquid crystal in conjunction with each of the pixel electrodes;
   a single pixel selecting circuit positioned on only one side of the common electrode and that sequentially selects the pixels;
   a line group for the pixel selecting circuit connected to input terminals of the pixel selecting circuit;
   a potential applying circuit that applies a potential to the pixel electrode of a selected pixel;
   a line group for the potential applying circuit connected to input terminals of the potential applying circuit; and
   a common electrode line connected to the common electrode and arranged so as to avoid crossing the line group for the pixel selecting circuit and the line group for the potential applying circuit,
   wherein the common electrode line extends between the line group for the pixel selecting circuit and the line group for the potential applying circuit, and extends into a terminal region along a routing path, and the arrangement and position of the line group for the potential applying circuit is such that it does not intersect with an area encompassed by the routing path of the common electrode line.

2. The array substrate for a liquid crystal panel according to claim 1, wherein the terminal region includes end portions of each of the common electrode line, the line group for the pixel selecting circuit, and the line group for the potential applying circuit.

3. The array substrate for a liquid crystal panel according to claim 1, wherein one end of the common electrode line is connected to the common electrode near a corner portion of an array of the pixels, the corner portion being adjacent to both the pixel selecting circuit and the potential applying circuit.

4. The array substrate for a liquid crystal panel according to claim 1, wherein the common electrode line is connected to the common electrode at a single location.

5. The array substrate for a liquid crystal panel according to claim 1, wherein the line group for the potential applying circuit extends from a first side of the potential applying circuit, and the common electrode line is routed around a second side of the potential applying circuit that is opposite to the first side of the potential applying circuit.

6. The array substrate for a liquid crystal panel according to claim 1, wherein:
   each of the terminal portions of the line group for the pixel selecting circuit are arranged on a first side of the terminal region,
   each of the terminal portions of the line group for the potential applying circuit are arranged on a second side of the terminal region opposite to the first side, and
   the terminal portion of the common electrode line is arranged in the terminal region between the terminal portions of the line group for the pixel selecting circuit and the terminal portions of the line group for the potential applying circuit.

7. A liquid crystal panel comprising:
   an array substrate including pixel electrodes corresponding to pixels, and also including a common electrode that is common to all of the pixel electrodes and that is capable of forming an electric field that controls an alignment of liquid crystal in conjunction with each of the pixel electrodes;
   an opposing substrate placed opposing the array substrate; and
   liquid crystal held between the array substrate and the opposing substrate, an alignment of which is controlled by an electric field between each of the pixel electrodes and the common electrode, wherein the array substrate further includes:
a single pixel selecting circuit positioned on only one side of the common electrode and that sequentially selects the pixels;
a line group for the pixel selecting circuit connected to input terminals of the pixel selecting circuit;
a potential applying circuit that applies a potential to the pixel electrode of a selected pixel;
a line group for the potential applying circuit connected to input terminals of the potential applying circuit; and
a common electrode line connected to the common electrode and arranged so as to avoid crossing the line group for the pixel selecting circuit and the line group for the potential applying circuit,
wherein the common electrode line extends between the line group for the pixel selecting circuit and the line group for the potential applying circuit, and is routed into a terminal region along a routing path, and the arrangement and position of the line group for the potential applying circuit is such that it does not intersect with an area encompassed by the routing path of the common electrode line.

8. The liquid crystal panel according to claim 7, further comprising:
an integrated circuit chip mounted on the array substrate and connected to the common electrode line, the line group for the pixel selecting circuit, and the line group for the potential applying circuit, wherein the common electrode line connects the integrated circuit chip and the common electrode.

9. The liquid crystal panel according to claim 7, wherein the terminal region includes end portions of each of the common electrode line, the line group for the pixel selecting circuit, and the line group for the potential applying circuit.

10. The liquid crystal panel according to claim 7, wherein one end of the common electrode line is connected to the common electrode near a corner portion of an array of the pixels, the corner portion being adjacent to both the pixel selecting circuit and the potential applying circuit.

11. The liquid crystal panel according to claim 7, wherein the common electrode line is connected to the common electrode at a single location.

12. The liquid crystal panel according to claim 7, wherein the line group for the potential applying circuit extends from a first side of the potential applying circuit, and the common electrode line is routed around a second side of the potential applying circuit that is opposite to the first side of the potential applying circuit.

13. The liquid crystal panel according to claim 7, wherein:
each of the terminal portions of the line group for the pixel selecting circuit are arranged on a first side of the terminal region,
each of the terminal portions of the line group for the potential applying circuit are arranged on a second side of the terminal region opposite to the first side, and
the terminal portion of the common electrode line is arranged in the terminal region between the terminal portions of the line group for the pixel selecting circuit and the terminal portions of the line group for the potential applying circuit.

\* \* \* \* \*